United States Patent [19]

Tachi et al.

[11] Patent Number: 4,904,163
[45] Date of Patent: Feb. 27, 1990

[54] OIL REGULATING PUMP FOR LUBRICATING ENGINES AND METHOD OF CONTROLLING THEREOF

[75] Inventors: Kozi Tachi, Kosai; Hideo Saji, Chita, both of Japan

[73] Assignees: Nippondenso Co., Ltd., Kariya; Asmo Co., Ltd., Kosai, both of Japan

[21] Appl. No.: 263,895

[22] Filed: Oct. 28, 1988

[30] Foreign Application Priority Data

Oct. 30, 1987 [JP] Japan .................... 62-167704[U]
Feb. 15, 1988 [JP] Japan ......................... 63-32522
Mar. 23, 1988 [JP] Japan ......................... 63-68816

[51] Int. Cl.$^4$ ............................ F04B 19/02; F04B 7/06
[52] U.S. Cl. ............................ 417/53; 417/492; 417/500; 184/33
[58] Field of Search ............... 417/500, 492, 461, 53; 184/33

[56] References Cited

U.S. PATENT DOCUMENTS

| | | | |
|---|---|---|---|
| 4,036,326 | 7/1977 | Mukai et al. ..................... | 184/33 |
| 4,231,716 | 11/1980 | Kubota et al. ..................... | 417/500 |
| 4,706,008 | 11/1987 | Cronch et al. ..................... | 318/696 |
| 4,706,456 | 11/1987 | Backe et al. ..................... | 318/696 |
| 4,774,918 | 10/1988 | Kurio et al. ..................... | 123/196 R |
| 4,797,073 | 1/1989 | Kubota ..................... | 417/500 |

FOREIGN PATENT DOCUMENTS 0158387 9/1984 Japan ......................... 417/500

Primary Examiner—Leonard E. Smith
Assistant Examiner—D. Scheneima
Attorney, Agent, or Firm—Burns, Doane, Swecker & Mathis

[57] ABSTRACT

An oil regulating pump for supplying oil to an engine, comprises: a pump housing provided with a suction route and a discharge route; a driving shaft inserted into said housing and rotated by the engine; a primary plunger rotated by the driving shaft; a secondary plunger inserted into a hole provided in an end of the primary plunger and formed a pump chamber communicable with the suction route and the discharge route for pumping; a motor provided with a mechanism for converting a rotation movement into a linear movement; a cam shaft abutted on an end of said driving shaft and linearly displaced by said motor, to reciprocate the driving shaft and to change a reciprocation stroke of the driving shaft; and a control device for controlling rotation of the motor.

4 Claims, 8 Drawing Sheets

Distance of Taper Part

OIL REGULATING PUMP FOR LUBRICATING ENGINES AND METHOD OF CONTROLLING THEREOF

BACKGROUND OF THE INVENTION

The present invention relates to an oil regulating pump and more particularly to the pump which may be utilized to supply oil to an engine and regulate the supply oil flow via a motor.

In a conventional oil regulating pump of this type, as illustrated in FIG. 12, a primary plunger 8 which is connected with a driving shaft 5 is slidably disposed within a pump casing 3 and is urged by a spring 9.

Since the driving shaft 5 is driven and rotated by an engine rotation force and the primary plunger 8 is rotated in accordance with rotation of the driving shaft 5, an oil suction route and an oil discharge route between the primary plunger 8 and the pump casing 3 are opened and closed, thereby supplying the oil to the engine.

Moreover, a volume of a pump chamber (not illustrated) which is formed between the primary plunger 8 and a secondary plunger 10 inserted into a hole provided in the primary plunger 8 is regulated by a cam shaft 48, because an eccentricity rate of an eccentric cam 47 can be changed by the rotation of the cam shaft 48, also because a position where the controlling cam 5A and the eccentric cam 47 abut is set by the eccentricity rate of the eccentric cam 47. That is, an oil discharge flow rate of said oil regulating pump is controlled by a rotation number and a stroke regulation of the driving shaft 5, and the pump rotation number is adapted to correspond to the engine rotation number. Because the rotation of the driving shaft 5 is reduced while the engine rotation is transmitted to the driving shaft 5 via a worm gear 6 at this time, the pump rotation number shows a value multiplying the engine rotation number by this reduction rate.

Meanwhile, two cam pins 7 are provided in positions opposite to a radial direction of a circumferential end of the driving shaft 5 and one controlling cam 5A is provided at a center in the end of the driving shaft 5, and the eccentric cam 47 is disposed in the cam shaft 48 (hereinafter referred to as a controlling shaft 48) wherein the eccentric cam 47 can be abutted on the controlling cam 5A. Therefore the position where the eccentric cam 47 abuts on the controlling cam 5A is changed by rotation of said controlling shaft 48, that is, due to eccentricity rate of the eccentric cam 47, the stroke of the primary plunger 8 can be changed, thereby controlling the oil flow.

However, in case of the above structure, the eccentric cam 47 requires high machining accuracy and also is difficult to machine because a shape of the eccentric cam 47 and a difference in angle between the eccentric cam 47 and the controlling shaft 48 causes a difference in contact between the controlling cam 5A and the eccentric cam 47, which results in a difference in stroke or a difference in flow rate. Also, regulation of the oil flow due to engine load is impossible and only the engine rotation number is controlled during a travelling time, because the stroke is manually regulated.

SUMMARY OF THE INVENTION

It is an object of the present invention to provide an oil regulating pump which permits automatic flow control by multiple signals other than an engine rotation number.

It is another object of the present invention to provide an oil regulating pump which permits supplying of oil in accordance with a travelling condition of a vehicle.

It is another object of the present invention to provide an oil regulating pump, in which a shape of controlling part in a cam shaft is excellently machined.

It is another object of the present invention to provide an oil regulating pump which permits improvement in a control range of oil and a resolving power.

It is a further object of the present invention to provide an oil regulating pump which permits comparatively highly reliable control without accumulation of a position error rate due to asynchronous operation of a stepping motor if a screw shaft is linearly displaced by the stepping motor.

It is a further object of the present invention to provide an oil regulating pump which is small and inexpensive without the need for installation of a rotation detector.

It is a still another object of the present invention to provide a method of controlling an oil regulating pump which eliminates a hysteresis error generated by a stepping motor if a screw shaft is linearly displaced by the stepping motor and permits improvement in a controlling accuracy.

An oil regulating pump which attains these and other objects includes: a pump housing provided with a suction route and a discharge route, a driving shaft inserted into said housing and rotated by the engine, a primary plunger rotated by the driving shaft, a secondary plunger inserted into a hole provided in an end of the primary plunger and formed a pump chamber communicable with the suction route and the discharge route for pumping, a motor provided with a mechanism for converting a rotation movement into a linear movement, a cam shaft abutted on an end of a shaft direction of said driving shaft and Which is linearly displaced by said motor to reciprocate said driving shaft and to change a reciprocation stroke of said driving shaft, and a control device for controlling rotation of said motor.

According to this structure, because the reciprocative displacement stroke of the primary plunger can be regulated by driving the cam shaft via the motor an engine condition is detected by sensors and an optimum oil rate is automatically regulated, thereby supplying the oil to the engine.

In an oil regulating pump which attains another object of the present invention, a controlling cam is provided in an end of said driving shaft and a conical taper cam is placed in said cam shaft at a position abuttable on said controlling cam.

According to this structure, the controlling part is excellently machined. Also a change rate in oil can be regulated just by regulating a length and an inclined angle of the taper cam, moreover a subtle regulation can be made.

In an oil regulating pump which attains another object of the present invention, said cam shaft is interlocked with advance and retract of a screw shaft of said motor having a screw mechanism, so is linearly displaced. The cam shaft is elastically urged by a spring toward said motor shaft.

According to this structure, a play of thrust direction of the screw part and the screw shaft of the motor can be prevented if the screw shaft is linearly displaced by converting the rotation into the linear movement due to the screw mechanism.

An oil regulating pump which attains a further object of the present invention includes: a stepping motor utilized for said motor a stopper located in a standard position of the stepping motor for stopping displacement of said screw shaft with the abutment, returning means which return said screw shaft to the standard position by sidplacing said screw shaft till the screw shaft abuts on said stopper, a correcting means wherein said screw shaft is restored to a command control position and a control is recommenced after said screw shaft is forcibly returned to the standard position once by said returning means for in a periodical manner and/or in a defined condition that the position error is generated more probably in a periodical manner.

Since the screw shaft located by the stepping motor is returned to the standard position periodically in the oil regulating pump as constructed as the above, the position error due to the asynchronous operation generated during the same time is corrected and therewith the position error due to the same operation is not accumulated.

A method of controlling of the oil regulating pump consists of: utilizing a stepping motor for said motor, calculating a command control angle position of the stepping motor by a sensor input signal to said control device, finding by this calculation a rotation direction and a displacement rate for rotation and displacement of the stepping motor from the present angle position to said command control angle position, and stopping the stepping motor from all predetermined directions in the command control angle position by n-steps rotation of the stepping motor in the predetermined direction, after rotating the stepping motor in the reverse direction by a step number which added n-steps to the displacement rate if the rotation direction is the reverse of the predetermined rotation direction.

According to the above structure, there occurrs no difference in stopping position generated in a conventional case that the normal rotation and the reverse rotation are used together and therewith the hysteresis error produced by the stepping motor can be eliminated, allowing improvement in the accuracy, because the stepping motor is stopped after rotated in the predetermined rotation directions of normal rotation and reverse rotation.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF PREFERRED EMBODIMENTS (First Embodiment)

Figure 1:
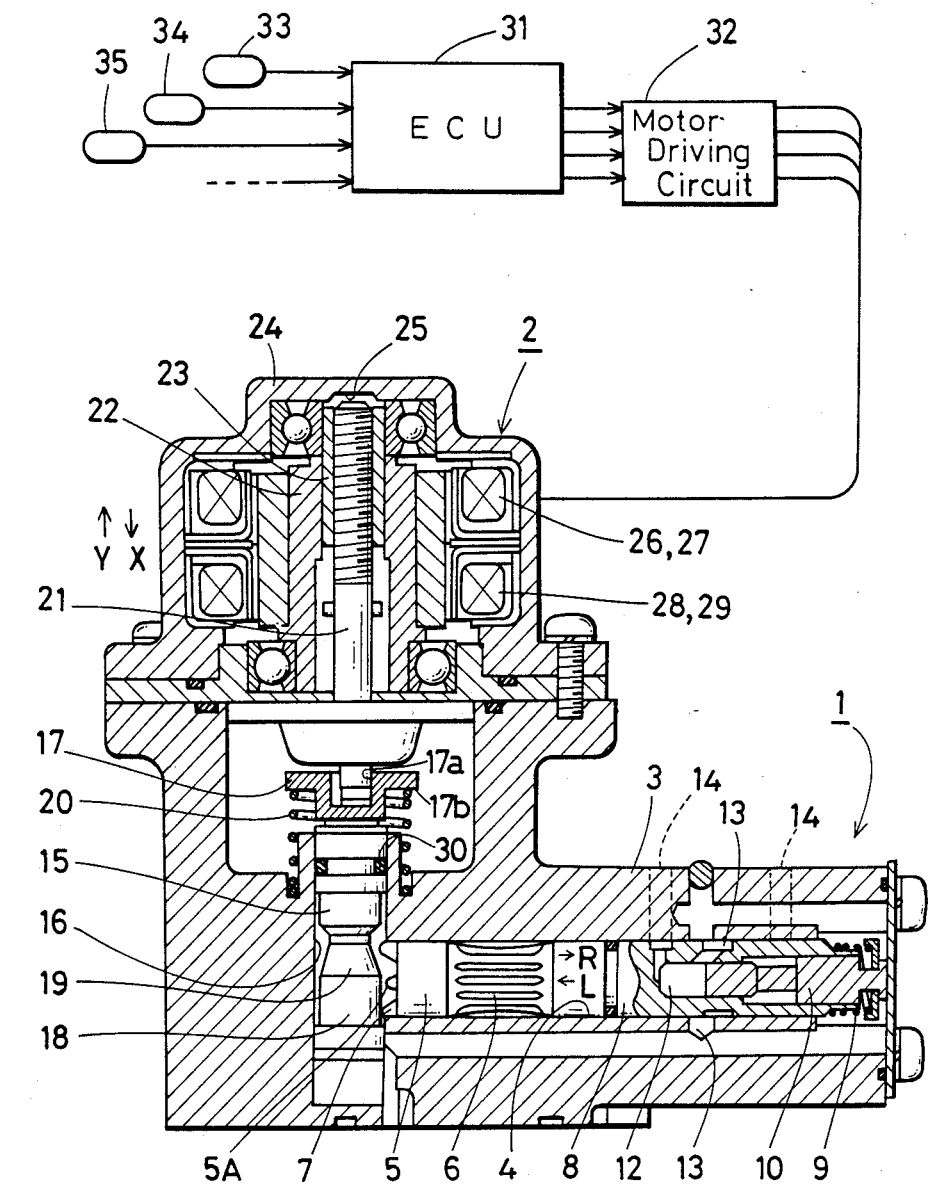
FIG. 1 is a sectional view illustrating the first embodiment of an oil regulating pump of the present invention.
Figure 2:
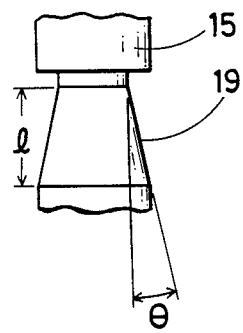
FIG. 2 is an enlarged view of a taper part in a cam shaft.
Figure 3:
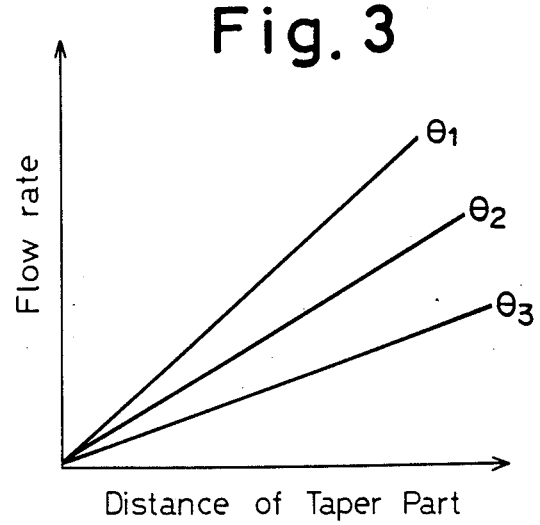
FIG. 3 is a diagram illustrating the relation between an inclined angle of the taper part and an oil flow rate.

The following is the description according to a first embodiment, as illustrated in FIGS. 1 to 3.

An oil regurating pump as illustrated in FIG. 1 supplies oil to an engine. A structure for discharging oil to an engine side due to operation of a primary plunger 8 by a driving shaft 5 is identical to that of said conventional example, except for a mechanism for regulating a stroke, but another explanation thereof is made with characteristics of the present invention.

In the oil regulating pump of the present embodiment, the primary plunger 8 which is connected with the driving shaft 5 is slidably disposed within a pump body or a pump casing 3 and is pushed or urged by a spring 9, as illustrated in FIG. 1.

Since the driving shaft 5 is driven and rotated by an engine rotation force and the primary plunger 8 is rotated in accordance with rotation of said driving shaft 5, an oil suction route and an oil discharge route between the primary plunger 8 and the pump body are opened and closed, thereby supplying the oil to the engine as not illustrated.

The driving shaft 5 is displaced toward the right as illustrated in FIG. 1 when a cam pin 7 abuts on a large diameter part 18 of a cam shaft 15. The driving shaft 5 is displaced toward the left as illustrated in FIG. 1 on the basis of an elastic force of the spring 9 and the controlling cam 5A abuts on one of the large diameter part 18 and the taper part 19 of the cam shaft 15 when the cam pin 7 does not abut on the large diameter part 18 due to rotation of the driving shaft 5. Thus, the driving shaft 5 is reciprocatively displaced toward the right and the eft as illustrated in FIG. 1.

Moreover, because the cam shaft 15 is regulated by a pump chamber 12 formed between the primary plunger 8 and the secondary plunger 10 inserted into a hole provided in the primary plunger 8, a position where the controlling cam 5A and the taper part 19 contact is set and can be changed. That is, an oil discharge flow rate of said metering pump is controlled by a rotation number and a stroke regulation of the driving shaft 5, and the pump rotation number is adapted to correspond to the engine rotation number.

Because the rotation of the driving shaft 5 is reduced while the engine rotation is transmitted to the driving shaft 5 via a worm gear 6 at this time, the pump rotation number shows a value multiplying the engine rotation number by this reduction rate. Meanwhile, two cam pins 7 are provided in positions opposite to a radial direction of a circumferential end of the driving shaft 5 and the one controlling cam 5A is provided at a center in the end of the driving shaft 5 and the eccentric cam 7 is disposed in the cam shaft 15 wherein the taper part 19 can be abutted on said controlling cam 5A. The stroke of the primary plunger 8 can be changed, so the oil rate is controlled by changing a shaft direction position where the taper part 19 abuts on the controlling cam 5A due to linear movement of the cam shaft 15 or, by an inclined angle of the taper part.

In the present embodiment, the conical taper part or taper cam 19 fixed in the cam shaft 15 is disposed in the position abuttable on the controlling cam 5A provided in the driving shaft 5. As illustrated in FIG. 2, the taper cam 19 is inclined by an angle $\theta$ for the cam shaft 15 and an diameter thereof is gradually enlarged in the shaft direction of the cam shaft 15 and has the length as l.

The cam shaft 15 is slidably inserted into a hole 16 formed in the pump body or pump casing 3 in a direction crossing the shaft direction of the driving shaft 5 at a right angle. A transmission metal member 17 is fixedly provided in an end of the cam shaft 15, wherein a concave part 17a is provided at a center part and a collar part 17b is provided in an outer circumference thereof. A spring 20 is provided in a compressed state between the metal member 17 and the pump body 3. Oil leakage is prevented by an O-shaped ring 30 between the cam shaft 15 and the hole of the pump body.

On the other hand, the motor 2 is fixed in the pump body. Utilizing the stepping motor for said motors, a step number is controlled by detecting the engine rotation number and an engine cylinder inner pressure. A screw shaft 21 which is linearly displaced by the motor is installed within the motor 2. An end of said screw shaft 21 is fitted on the concave part 17a of said transmission metal member 17.

Since the transmission metal member 17 fitted on the screw shaft 21 is urged by the spring, as stated above, it is interlocked and displaced when the screw shaft 21 is displaced in X direction or an arrow in the drawing. Also, when the screw shaft 21 is displaced in Y direction, the metal member 17 is urged by the spring 20, so is displaced in Y direction with the screw shaft 21. As constructed as above, the cam shaft 15 is linearly displaced in the shaft direction due to linear movement of the screw shaft 21 by the motor 2, so the taper cam 19 formed in the cam shaft 15 is linearly displaced. Since the position of the controlling cam 5A abutting on the taper cam 19 is changed due to displacement of said taper cam 19, an oil rate is regulated. In this case, there is shown in FIG. 3 the relation of oil flow rate to the inclined angle $\theta$ of the taper cam ($\theta_1 > \theta_2 > \theta_3$).

As explained above, since in the oil regulating pump relative to the present invention the motor with a mechanism for converting the rotation into the linear movement is utilized and the pump is so constructed as to form the conical taper cam in the cam shaft, the taper cam is linearly displaced and the position of the controlling cam abutting on an inclined face of said taper cam can be subtly regulated and be positively controlled, thereby allowing improvement in the enlargement of control range and the resolving power of oil.

Moreover, the stroke is regulated due to displacement of the cam shaft by the motor, therefore there is advantage in that an engine condition signal is detected and the motor can be controlled by the signal, which permits supplying of the oil according to a travelling condition.

(Second Embodiment)

A second embodiment of the present invention is described with reference to FIGS. 4 to 7 and in use of FIG. 1 illustrating the first embodiment.

FIG. 1 is a sectional view illustrating an embodiment in which a device of the invention is applied for an oil regulating pump. The oil regulating pump 1 supplies oil to an apex-sealed part and a side-sealed part of a rotary engine, synchronizing with rotation of the engine and controlls the supply oil flow via a stepping motor 2. There is shown herein a synopsis of the oil regulating pup. A driving shaft 5 is rotatably inserted in a manner slidable in a shaft direction into a hole 4 provided in a direction horizontal to a drawing of a pump casing 3. A worm gear 6 engaging with a driving gear (not illustrated) is formed in a center of the driving shaft 5, also in an end thereof are provided a projecting cam pin 7 and a controlling cam 5A. A primary plunger 8 is inserted in a manner slidable in a shaft direction and is connected with the driving shaft 5. The primary plunger 8 is pressed for the driving shaft 5 due to urge by a spring 9. The primary plunger 8 is cylindrically formed and is fixed in the casing 3 in such a condition that a secondary plunger 10 is inserted into an inner hole of the primary plunger. A pump chamber 12 is composed of the inner hole and the secondary plunger 10 which are provided in the primary plunger 8. An oil suction route 13 and an oil discharge route 14 are opened and closed due to rotation and shaft direction reciprocation of the cylindrical primary plunger, supplying the oil to the engine (not illustrated). The cam pin 7 and the controlling cam 5A provided in an end of the driving shaft 5 abut on a cam shaft 15 disposed in a direction perpendicular to the drawing. The cam shaft 15 is inserted into a hole 16 formed in the pump casing 3 in a manner slidable in a shaft direction. A metal member 17 is fixedly provided in an upper end of the cam shaft. A compression spring 20 is provided in a compressed state between a collar 17b of the metal member 17 and the casing 3 and urges the cam shaft 15 in Y direction in FIG. 1.

Meanwhile, a screw shaft 21 being an output shaft of the stepping motor 2 is fitted on the concave part 17a of the metal member 17 in the center of the shaft from above, which results in limiting a position of the shaft direction of the cam shaft 15. The screw shaft 21 is not rotated, but is linearly displaced in the shaft direction in accordance with rotation of a rotar 22 of the stepping motor 2.

In the cam shaft 15, a part abutting on the controlling cam 5A consists of a large diameter part 18 and a taper part 19 with a diameter gradually reduced subsequent thereto.

As the driving shaft 5 is rotated and driven by the driving gear (not illustrated) while synchronizing with rotation of the engine, due to urging force of the spring 9, the driving shaft 5 is so rotated and driven as to alternate such a condition that the controlling cam 5A abuts on the large diameter part 18 and/or the taper part 19 of the cam shaft and such that the cam pin 7 abuts on the large diameter part 18. Since the controlling cam 5A is lower in size than the cam pin 7, the driving shaft 5 is reciprocatively displaced in the shaft direction and the primary plunger 8 is reciprocatively displaced by said driving shaft, which results in discharging the oil by a defined rate. Since the stroke of the reciprocative displacement is determined by the position where the controlling cam A abuts on the taper part 19 and/or the large diameter part 18, controlling the shaft direction of the cam shaft 15 results in regulation of the discharge rate of the oil.

The stepping motor for controlling the shaft direction position of the cam shaft 15 is rotated with the rotar 22 while a feed nut 23 with a female screw hole is fixed in the center of the rotar 22. The screw shaft 21 being the output shaft is screwed into the feed nut 23 and is displaced in the shaft direction in accordance with rotation of the rotar 22. The screw shaft 21 is adapted to abut on an abutting part 25 of a housing 24 of the stepping motor in a retract end thereof. The abutting part 25 of the stepping motor housing 24 functions as a stopper which stops displacement of the screw shaft 21 mechanically in a standard position.

The stepping motor 2 is utilized in four phase system. Respective coils 26, 27, 28 and 29 is connected to a driving circuit 32 and is controlled by an electronic control unit (ECU) 31 with a microcomputer. Signals are inputted in the electronic control unit 31 from various running condition sensors, such as an engine rotation number sensor 33, an accelerator opening sensor 34 and a cooling water temperature sensor 35. In the electronic control unit 31, a command control position of the screw shaft 21 for feeding the optimum oil discharge rate is operated by the running condition information, and a driving pulse is outputted to the driving circuit 32 so as to realize the gradually changed command control position.

Figure 4:
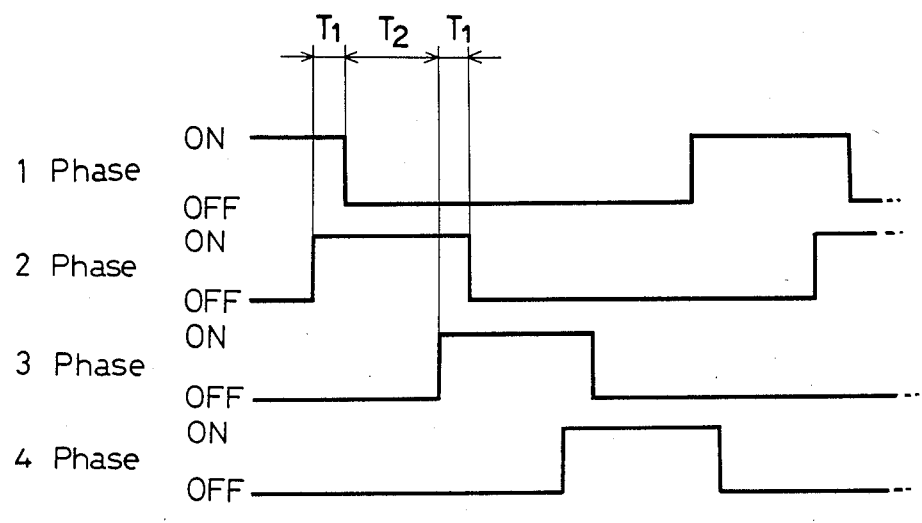
FIG. 4 is a waveform view illustrating therefore excitation phases of a stepping motor.
Figure 5:
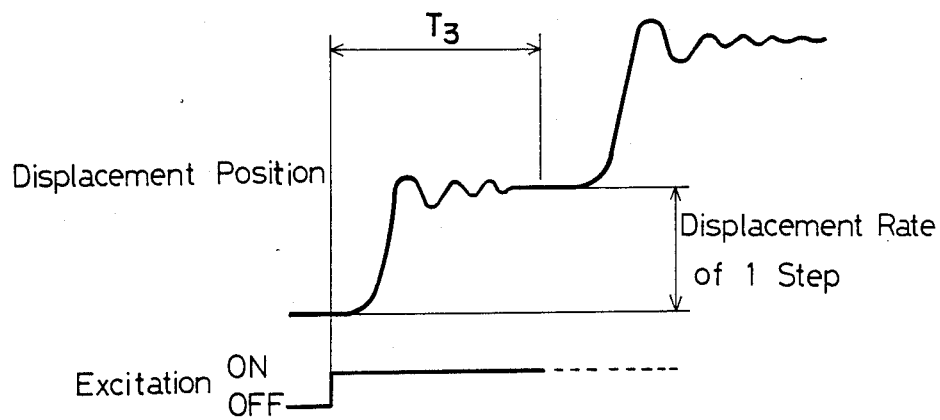
FIG. 5 is a waveform view illustrating a damped oscillation.

FIG. 4 is a waveform diagram illustrating exciting waveforms of the respective coils 26, 27, 28 and 29. In 4 phase excitation system, excitation of each phase coil is switched in order of 1-2 phase excitation, 2 phase excitation, 2-3 phase excitation and 3 phase excitation, which results in rotation of the rotar 22. At this time, an irregular excitation is so executed that a time $T_2$ when only one coil is excited is longer than a time $T_1$ when two coils is simultaneously excited. In comparison with a conventional excitation method that the times $T_1$ and $T_2$ are equalized, the irregular excitation method that the time $T_2$ is longer than the time $T_1$ shortens a settling time $T_3$ of a damped oscillation generated when the excitation by each step angle is switched and therewith stabilizes the position, as illustrated in FIG. 5.

In ECU 31, during an idling time of the engine, the screw shaft 21 located in the command control position is displaced in the retract end and an end of said shaft is adapted to abut on the abutting part 25 of the housing 24, returning said shaft 21 to the standard position. The screw shaft 21 is returned to the standard position by outputting command pulses more than the stroke of the screw shaft 21 and by abutting the screw shaft 21 on the abutting part 25 of the housing 24. The shaft 21 is stopped in the standard position by stopping the command pulse in the excitation phase of 1-2 phase excitation, because the stopping position is most stabilized in 1-2 phase excitation. It will be appreciated that it can be detected by the exciting current waveform that the screw shaft 21 abuts on the housing and said shaft 21 can be adapted to be stopped in 1-2 phase excitation. Once the screw shaft 21 is returned to the standard position, said shaft 21 is restored to the command control position on basis of the same standard position and the control is recommenced in accordance with respective running condition. The position error till the present is eliminated and corrected by recommencing the control in the mechanically determined standard position. The position error correcting operation for returning to the standard position is finished for 1s., therefore if the above operation is carried out, problems does not occur during the idling time of the engine even if the oil rate is changed during operation thereof. Also, the position error can be timely corrected as it is more probable that the engine is in the idling condition periodically during driving of a vehicle, for example in case of waiting for a traffic signal.

Figure 6:
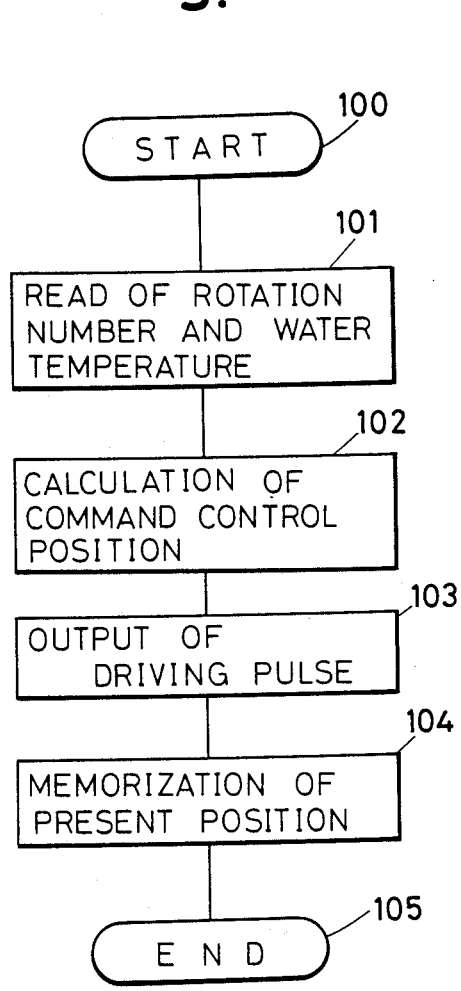
FIG. 6 is a flow chart illustrating the processes of the first embodiment of the invention.
Figure 7:
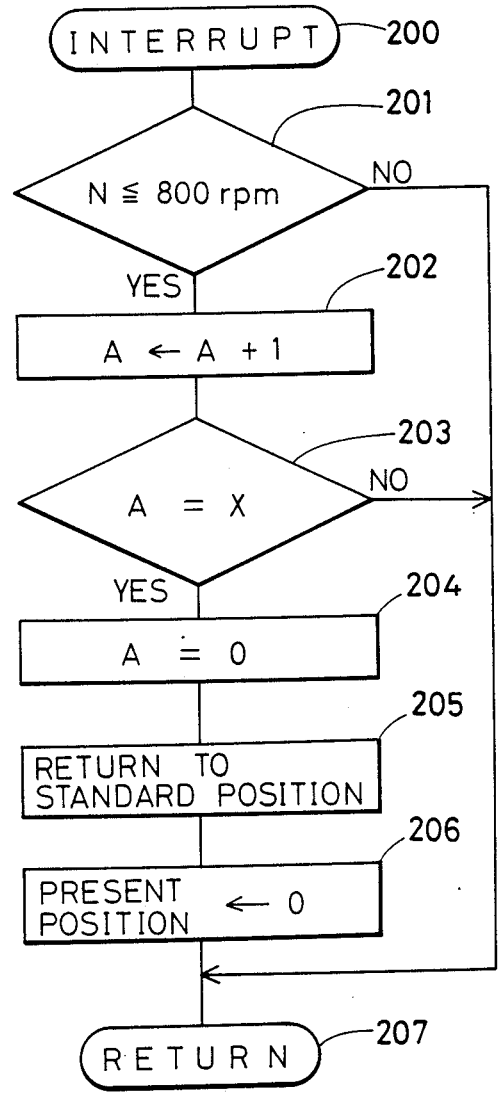
FIG. 7 is a flow chart illustrating the processes of the second embodiment of the invention.

FIG. 6 and FIG. 7 are flow charts illustrating the process of the microcomputer within ECU 31. The process 100 is a process for controlling the screw shaft 21 in the command control position in accordance with the running condition, and is regularly repeated. As the process 100 is started, the rotation number and the water temperature are read by the engine rotation number sensor 33 and the cooling water temperature sensor 35 (step 101), then there is calculated the command control position for feeding the optimum oil discharge rate in accordance with the above running condition informations (step 102). The driving pulse is outputted according to difference between the command control position and the recorded present position (step 103). The outputted driving pulse is integrated and the data memorized as the present position is renewed (step 104).

On the other hand, the process 200 is conducted as an interrupt process by the idle position signal from the accelerator opening sensor 34. As the accelerator is returned to the idle position, the process 200 is started. In step 201 a check is made as to whether or not the engine rotation number is less than 800 rotations. It is discriminated by the engine rotation number whether or not the engine is in the idle condition. If the engine rotation number is more than 800 rotations, nothing is conducted, finishing this process. If the above number is less than 800 rotations, it is determined that the engine is in the idle condition, and the process continues to step 202. In step 202, a value in a counter A is gained, next a check is made as to whether or not the value in counter A is more than X. For instance, value 5 is set as the value X and each time the engine is in the idle condition five times, the operation for returning to the standard position is carried out. If the counter A is less than X, the process continues to step 207 and nothing is conducted, finishing this process. If the value in counter A reaches X, the process continues to steps below step 204. In step 204, the value in the counter A is reset to 0. In step 205, the screw shaft 21 is returned to the standard position. The above process is conducted by outputting the driving pulses more than the stroke of the screw shaft and finally by stopping the shaft in 1-2 phase excitation. In step 206, the data of the present position which memorizes integration of the driving pulse till the present is reset to 0, and the process 200 is finished. Because in the process 100 returned from the interrupt process 200, the data of the present position is reset to 0, the driving pulses are outputted corresponding to displacement from the standard position to the command control position and the position error is corrected, thereby returning the screw shaft to the original control position.

In the second embodiment as previously stated, the housing 24 is utilized for the stopper which stops displacement of the screw shaft 21 in the standard position mechanically by providing the abutting part 25 in said housing 24 of the stepping motor 2. Also, a projecting stopper provided in an outer circumferece of the screw shaft 21 may be so constructed as to abut on a projection provided in an inner circumference of a rotar 22 and cause the rotar 22 to be stopped.

As previously explained, since the present invention is constructed as above, the invention has an advantage that the position error due to asynchronous operation can be corrected without installation of the rotation detector in the stepping motor and therewith the position error is not accumulated. Therefore there is a further advantage in that the rotation detector can be disused from the control device wherein the stepping motor is utilized, which allows providing of a small and inexpensice device.

(Third Embodiment)

Referring now to FIGS. 8 to 11 and FIG. 1 in which the first embodiment is shown, the third embodiment of the present invention will be explained.

Figure 9:
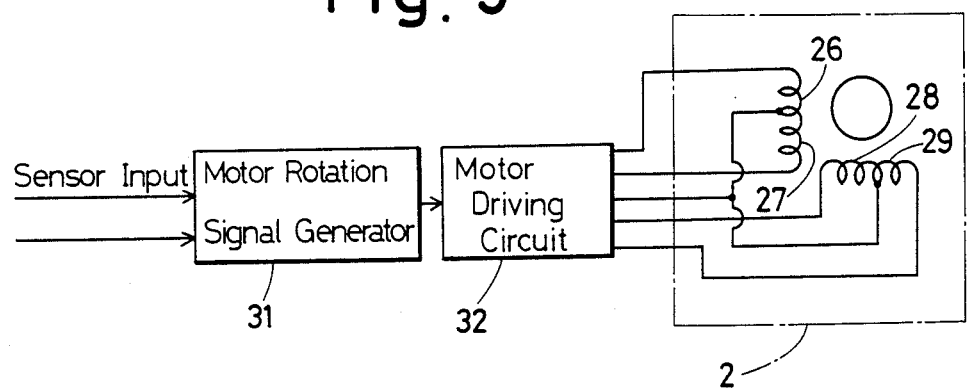
FIG. 9 is a block diagram illustrating a stepping motor control circuit in the present embodiment.
Figure 10:
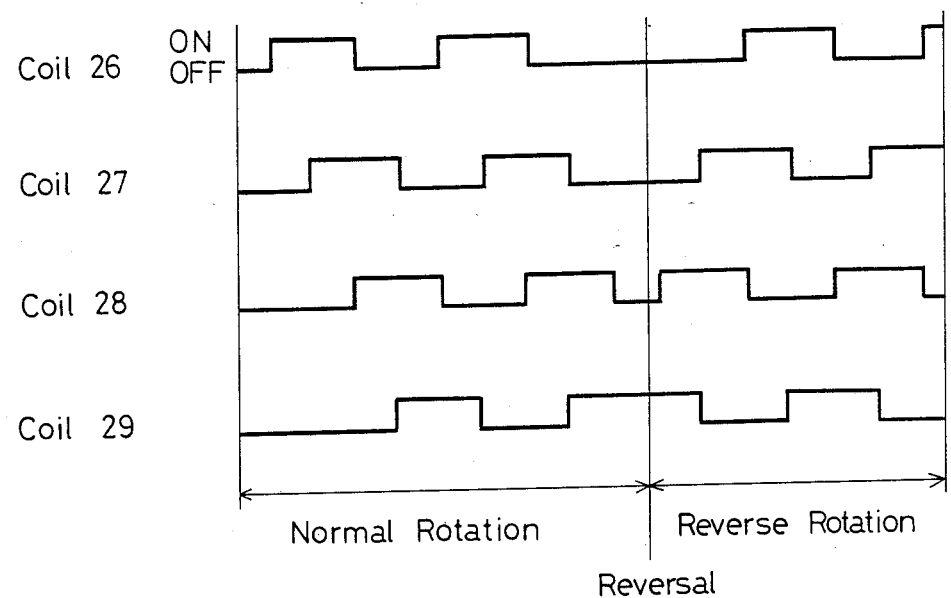
FIG. 10 is an explanatory view of a pulse exciting current for rotating and driving the stepping motor, as illustrated in FIG. 9.

FIG. 9 illustrates a stepping motor control circuit in the present embodiment. A stepping motor 2 is provided with four stator coils 26, 27, 28 and 29. The stator coils 26 to 29 are connected to a motor driving circuit 32. Pulses 100 pps to some 1000 pps generated by the motor driving circuit 32 are supplied to said stator coils. An electronic control unit or a motor rotation signal generation circuit 31 is composed of a microcomputer including a central process unit (CPU) and a memory, and generates a motor rotation signal, based on sensor input signals, such as an engine rotation number and a water temperature. A current is applied to the stator coils 26 to 29 in a timing as shown in FIG. 10 by a pulse exciting current generated by the motor driving circuit 32 in accordance with the motor rotation signal, thereby rotating the motor in a normal and a reverse direction. The stepping motor in the present embodiment is driven in two phase unipolar system. Since the stepping angle is 11.25°, one rotation requires 32 steps.

FIG. 1 illustrates an oil regulating pump, in which the stepping motor 2 is utilized. Because the screw shaft 21 provided in the stepping motor 2 is advanced and retracted as arrow X and Y due to the normal and the reverse rotation of the stepping motor 2, the cam shaft 15 is advanced and retracted. Thereby, a reciprocative actuation stroke of the driving shaft 5 can be changed in accordance with a stopping position of the taper part 19 of said cam shaft.

The following is the description of actuation of the third embodiment.

Figure 8:
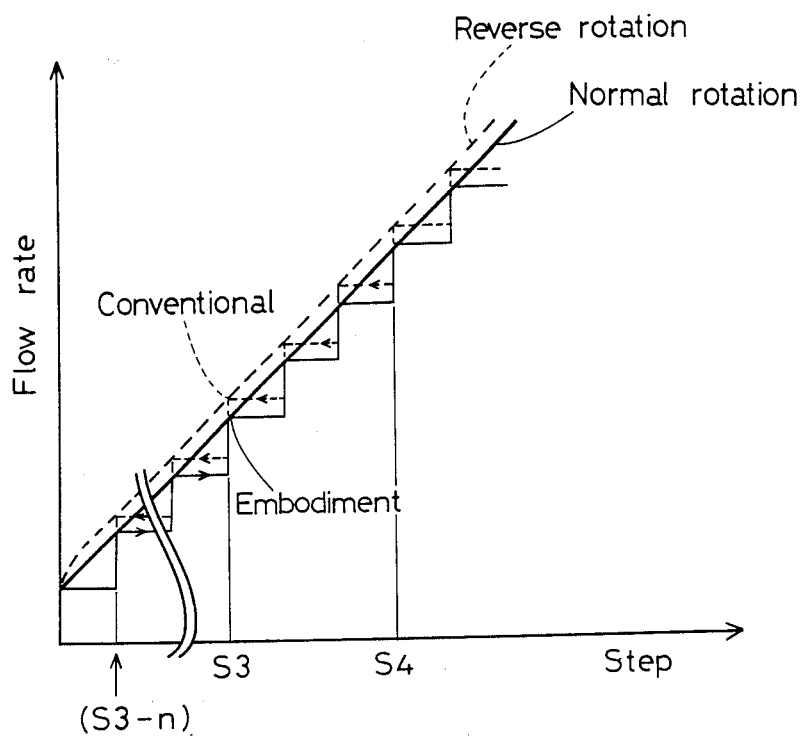
FIG. 8 is a characteristic view illustrating a control method for eliminating influence on a flow rate due to hysteresis error in the third embodiment of the present invention.

In the present embodiment, the stepping motor is stopped only when rotated in the normal direction for purpose of eliminating a flow rate change due to hysteresis error. FIG. 8 shows a method for the same actuation. Because the stepping motor 2 is rotated in a reverse direction in order to be rotated and displaced from the present angle position $S_4$ step to $S_3$ step, the stepping motor 2 is stopped after rotated in the normal direction by n step to $S_3$ step position after said motor is rotated in the reverse direction by $(S_4-S_3) + n$ step and is once returned to $(S_3-n)$ step position. In the present embodiment, a flow rate error can be eliminated as n=2 step. The number of n step is not limited to said number. Also, in the present embodiment, the driving shaft, as well as a primary plunger 8, is reciprocatively actuated in accordance with stopping position of a taper cam 19 by advancing and retracting the cam shaft 15 in a range of defined step numbers. The step number is regulated between $S_3$ step and $S_4$ step, so that the reciprocative actuation stroke of the driving shaft 5 is changed for purpose of the flow rate regulation.

Figure 11:
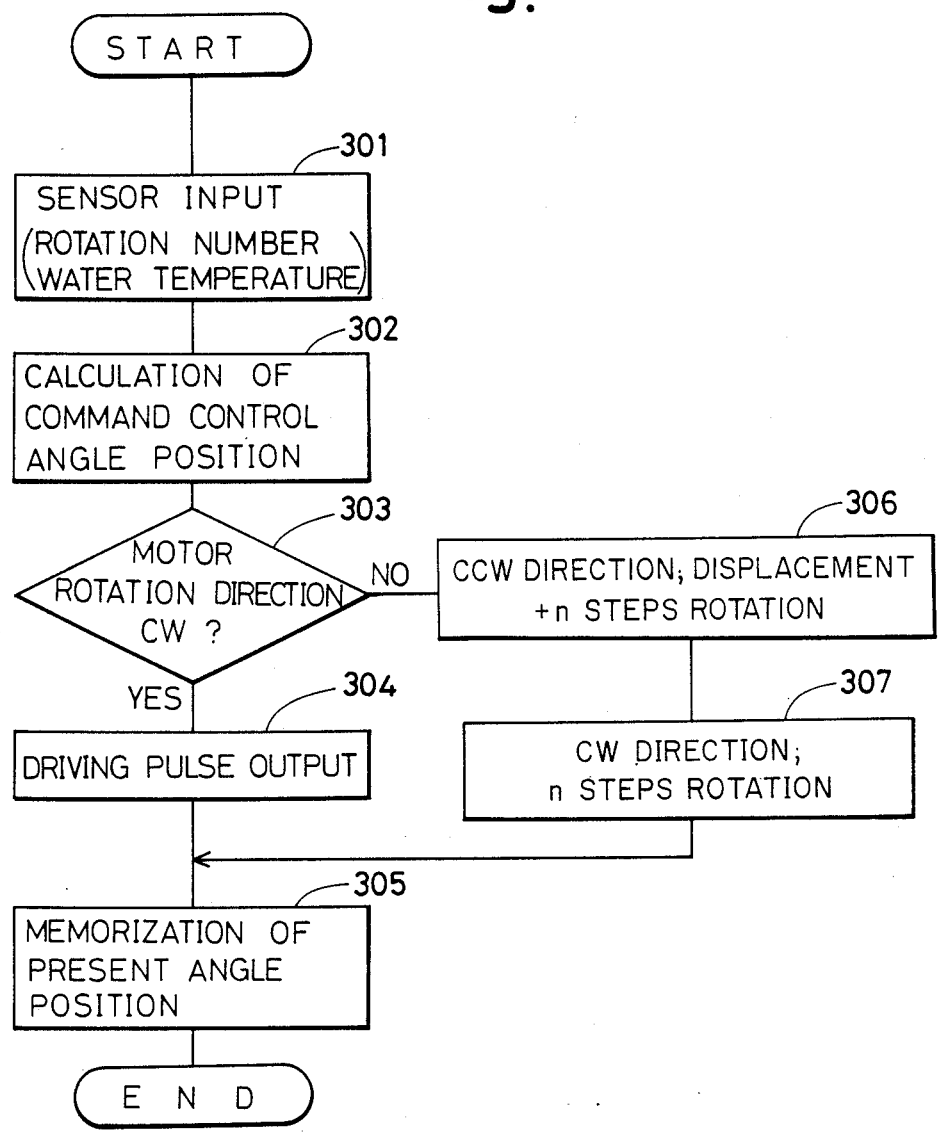
FIG. 11 is a flow chart illustrating actuation of a motor rotation signal generation circuit.
Figure 12:
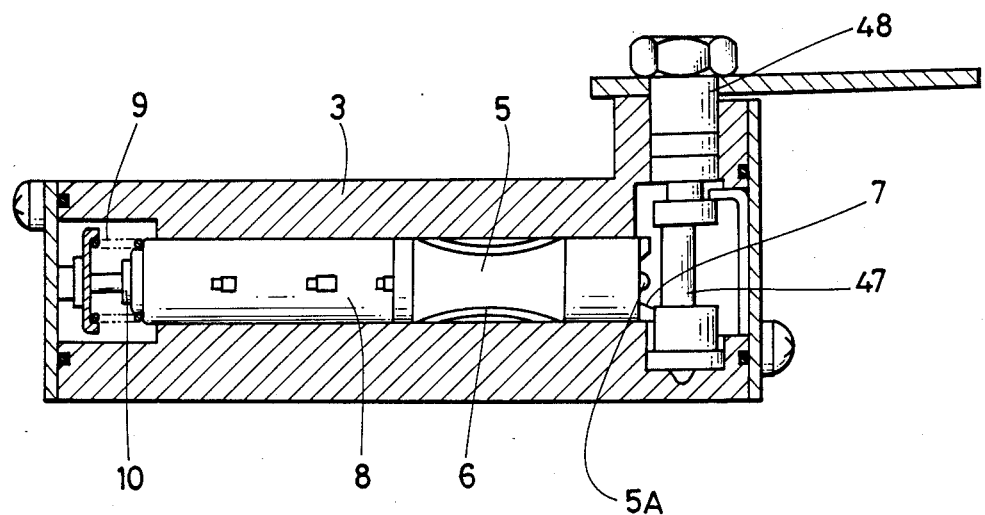
FIG. 12 is a sectional view illustrating a conventional example.

Moreover, an actuation of the present embodiment is explained referring to a flow chart as illustrated in FIG. 11. As the program is started, in step 301 the sensor input signals, such as the engine rotation number and the water temperature, are put in the motor rotation signal generation circuit 31, as illustrated in FIG. 9 in step 301. In step 302, the command control angle position is calculated. This calculation can find the rotation direction and the displacement of stepping motor for rotating and displacing the stepping motor from the present angle position for the command control angle position. In step 303, it is determined whether or not the rotation of stepping motor is in a normal direction. If the determination result in step 303 is positive, the driving pulse is outputted in step 304 and the present angle position is memorized in step 305, ending the process. If the determination result in step 303 is negative, the stepping motor is rotated in the reverse direction by the rotation displacement + n steps in step 306. Also, in step 307 the stepping motor is rotated in the normal direction by n steps and in step 305 the present angle position is memorized, ending the process.

Also, the stepping motor may be adapted to be stopped from the direction of the predetermined reverse rotation, not only the normal rotation, in the method of the present embodiment.

The advantages offered by the present invention are mainly that in the method for controlling of the stepping motor, the stepping motor is stopped in the command control angle position from all the predetermined rotation directions when said motor is stopped; therefore the hysteresis error generated by the stepping motor is eliminated, which allows improvement in the accuracy and elimination of an increase in cost due to improvement in a part machining accuracy and an assembly accuracy.

While a preferred embodiment of the invention has been described using specific terms, such description is for illustrative purposes only, and it is to be understood that changes and variations may be made without departing from the spirit or scope of the following claims.

What is claimed is:

1. An oil regulating pump for supplying oil to an engine, comprising:
   a pump housing provided with a suction route and a discharge route;
   a drive shaft disposed in said housing and rotated by the engine;
   a primary plunger rotated by the drive shaft;
   a secondary plunger inserted into a hole provided in an end of the primary plunger and forming a pump chamber communicable with the suction route and the discharge route;
   a stepper motor having a rotor and output shaft and provided with a mechanism for converting rotation of the rotor into linear movement of the output shaft;
   a cam shaft abutting an end of said drive shaft and linearly disposed by the output shaft in order to reciprocate said drive shaft and to change the reciprocation stroke of said drive shaft;
   a stopper disposed adjacent to said stepper motor for stopping displacement of the output shaft in a standard position; and
   control means for positioning the output shaft to a desired command control position; said control means further including correction means for periodically returning the output shaft, in accordance with predetermined conditions, to the standard position prior to recommencing a command control position.

2. The oil regulating pump as claimed in claim 1, wherein a control cam is provided on an end of said drive shaft and a conical tapered cam is provided on an end of said cam shaft, such that the conical tapered cam abuts the control cam.

3. The oil regulating pump as claimed in claim 1, which further includes means for interlocking the output shaft to said cam shaft, such that said cam shaft is linearly displaced by the output shaft, said interlocking means further including a spring which urges said cam shaft towards the output shaft.

4. A method of controlling an oil regulating pump having control means and a stepper motor which rotates in a normal direction and a reverse direction, comprising the steps of:

calculating a command control angle position for the stepper motor in response to sensor input signals inputted to said control means;

determining a rotation direction and a displacement of the stepper motor from a present angle position to a desired command control angle position;

rotating the stepper motor in the normal direction to a desired command control position, if the desired rotation is in the normal direction;

rotating the stepper motor in the reverse direction by the desired rotation displacement plus n steps and then rotating the stepper motor in the normal direction by n steps, if the desired rotation is in the reverse direction;

memorizing the present angle position after each normal direction rotation of the stepper motor; and stopping the stepper motor.

* * * * *